US009962816B2

(12) United States Patent
Chen

(10) Patent No.: US 9,962,816 B2
(45) Date of Patent: May 8, 2018

(54) PNEUMATIC TOOL USING SINGLE CONTROLLER FOR BOTH FORWARD/REVERSE SWITCHING AND SPEED ADJUSTMENT

(71) Applicant: TRANMAX MACHINERY CO., LTD., Taichung (TW)

(72) Inventor: Hsin-Chi Chen, Taichung (TW)

(73) Assignee: TRANMAX MACHINERY CO., LTD., Taichung (TW)

( * ) Notice: Subject to any disclaimer, the term of this patent is extended or adjusted under 35 U.S.C. 154(b) by 465 days.

(21) Appl. No.: 14/695,453

(22) Filed: Apr. 24, 2015

(65) Prior Publication Data
US 2015/0306746 A1 Oct. 29, 2015

(30) Foreign Application Priority Data

Apr. 28, 2014 (TW) .............................. 103115186 A

(51) Int. Cl.
B25B 21/00 (2006.01)
(52) U.S. Cl.
CPC .................... *B25B 21/00* (2013.01)
(58) Field of Classification Search
CPC .............................. B25B 21/00; F16K 31/445
USPC .................................... 173/200, 90, 168–169
See application file for complete search history.

(56) References Cited

U.S. PATENT DOCUMENTS

| | | | | |
|---|---|---|---|---|
| 7,311,155 B2* | 12/2007 | Chang | ....................... | B25F 5/00 173/104 |
| 7,594,549 B2* | 9/2009 | Hua | ....................... | B25B 21/00 173/104 |
| 8,267,190 B2* | 9/2012 | Li | ........................... | B23Q 5/00 173/104 |
| 9,643,301 B2* | 5/2017 | Chen | ................... | B25B 23/1453 |
| 2004/0221901 A1* | 11/2004 | Chen | ................... | F16K 11/0853 137/625.23 |
| 2008/0047721 A1* | 2/2008 | Chen | ........................ | B25F 5/00 173/15 |
| 2012/0325511 A1* | 12/2012 | Cheng | ..................... | B25B 21/00 173/169 |
| 2014/0034345 A1* | 2/2014 | Kumar | .................... | B25F 5/005 173/169 |
| 2015/0097641 A1* | 4/2015 | Chen | ....................... | B25B 21/00 335/126 |
| 2015/0174744 A1* | 6/2015 | Scott | ...................... | B25B 21/026 173/15 |
| 2015/0190917 A1* | 7/2015 | Hua | ......................... | B25F 5/00 173/169 |

* cited by examiner

*Primary Examiner* — Hemant M Desai
*Assistant Examiner* — Lucas Palmer
(74) *Attorney, Agent, or Firm* — Muncy, Geissler, Olds & Lowe, P.C.

(57) ABSTRACT

A pneumatic tool includes a housing that contains an installation tunnel, an air supplying channel and first and second air inlets, a control valve installed in the installation tunnel for shifting among first, second and third positions; a controller that is mounted on the control valve and has two paddles; a pushing rod that passes through the controller and the control valve; and a trigger that is attached to the pushing rod. The pneumatic tool provides the controller for a user to selectively operate with his/her left hand or right hand to perform forward/reverse switching and speed adjustment.

8 Claims, 12 Drawing Sheets

PNEUMATIC TOOL USING SINGLE CONTROLLER FOR BOTH FORWARD/REVERSE SWITCHING AND SPEED ADJUSTMENT

BACKGROUND OF THE INVENTION

1. Technical Field

The present invention relates to pneumatic tools, and more particularly to a pneumatic tool using a single controller for both forward/reverse switching and speed adjustment.

2. Description of Related Art

A conventional pneumatic tool primarily comprises a housing that has an air supplying channel and an exhausting channel, a motor installed in the housing, an output shaft extending out the housing and driven by the motor, and a control that controls the operation of the motor. The control comprises a button exposed outside the housing, and a pushing rod driven by the button. When a user presses the button, the pushing rod opens an air inlet valve installed in the air supplying channel, so as to allow gas in the air supplying channel to flow through a specific route to drive the motor.

Such a pneumatic tool is extensively used with a sleeve mounted around its output shaft for screwing or unscrewing a screw or a nut. Stating differently, most pneumatic tools allow users to change the rotational direction of their output shafts. Therefore, the control further comprises a forward/reverse switching lever for users to operate, and a switching valve driven by the forward/reverse switching lever to change the air route. For facilitating both left-handed and right-handed users to smoothly operate the forward/reverse switching lever, the forward/reverse switching lever for a conventional pneumatic tool allows the user to reposition its operating paddle. For repositioning the paddle, the user has to first pull the forward/reverse switching lever outward and then rotate it. After released, the forward/reverse switching lever is returned by a spring basing it. The mechanism is thus complicated in terms of design and inconvenient to use.

The control for the known pneumatic tool usually has a rotation-rete adjuster, which comprises a dial for users to operate and change a gas flow that drives the motor, thereby adjusting the rotation rate of the output shaft. It is clear that the control of the conventional pneumatic tool uses two different controllers (i.e. the foregoing forward/reverse switching lever and the dial of the rotation-rete adjuster) for users to perform forward/reverse switching (namely changing the rotational direction of the output shaft) and adjust the rotation rate of the output shaft. The control is thus structurally complicated and inconvenient to use.

BRIEF SUMMARY OF THE INVENTION

In view of the shortcomings of the prior art, the primary objective of the present invention is to provide a pneumatic tool, which uses a single controller for users to perform both forward/reverse switching and speed adjustment. It is structurally simple and easy to use, and the controller allows a user to selectively operate with his/her left or right hand.

For achieving the foregoing objective, the disclosed pneumatic tool using a single controller for both forward/reverse switching and speed adjustment comprises a housing, a control valve, the controller, a pushing rod, and a trigger. The housing has an installation tunnel, and an air supplying channel, a first air inlet and a second air inlet communicated with the installation tunnel. The control valve is shiftable among a first position, a second position, and a third position while it is installed in the installation tunnel. The control valve has an air incoming channel communicated with the air supplying channel, and an air supplying hole communicated with the air incoming channel. The air supplying hole has an opening facing the housing. The controller has a main body installed on the control valve, and two paddles extending from two opposite sides of the main body. The two paddles are exposed outside the housing for a user to operate one said paddle in order to rotate the controller and the control valve. The pushing rod passes through the controller and the control valve, and can move along an imaginary axis. The pushing rod has an inner end located in the air supplying channel, and an outer end opposite to the inner end. The trigger is provided at the outer end of the pushing rod. Therein, the air supplying hole is communicated with the first air inlet when the control valve is at the first position, and is communicated with the second air inlet when the control valve is at the second position and the third position. Corresponding areas between the opening of the air supplying hole and the second air inlet formed when the control valve is at the second position and at the third position are different.

Thereby, the pneumatic tool can use gas flowing through the air supplying channel, the air incoming channel, the air supplying hole, and the first air inlet or the second air inlet in order to drive a motor received in the housing, and can make the gas after flowing through the first air inlet drive the motor to rotate reversely, and after flowing through the second air inlet drive the motor to rotate forward. In other words, a user can operate the controller by shifting the control valve to the first position to make the motor rotate reversely, or by shifting the control valve to the second position or the third position to make the motor rotate forward. Therein, gas flows passing through the second air inlet when the control valve is at the second position and when the control valve is at the third position are different, thereby making the motor rotate at different rates. In other words, the disclosed pneumatic tool uses the single controller for users to perform forward/reverse switching and speed adjustment. It is structurally simple and easy to use. In addition, the two paddles of the controller allow users to smoothly operate with wither their left hands or right hands holding the pneumatic tool. Hence, the controller is well adaptive to both left-handed and right-handed users without using any converting means. This allows convenient use of the tool.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention.

DETAILED DESCRIPTION OF THE INVENTION

Figure 1:
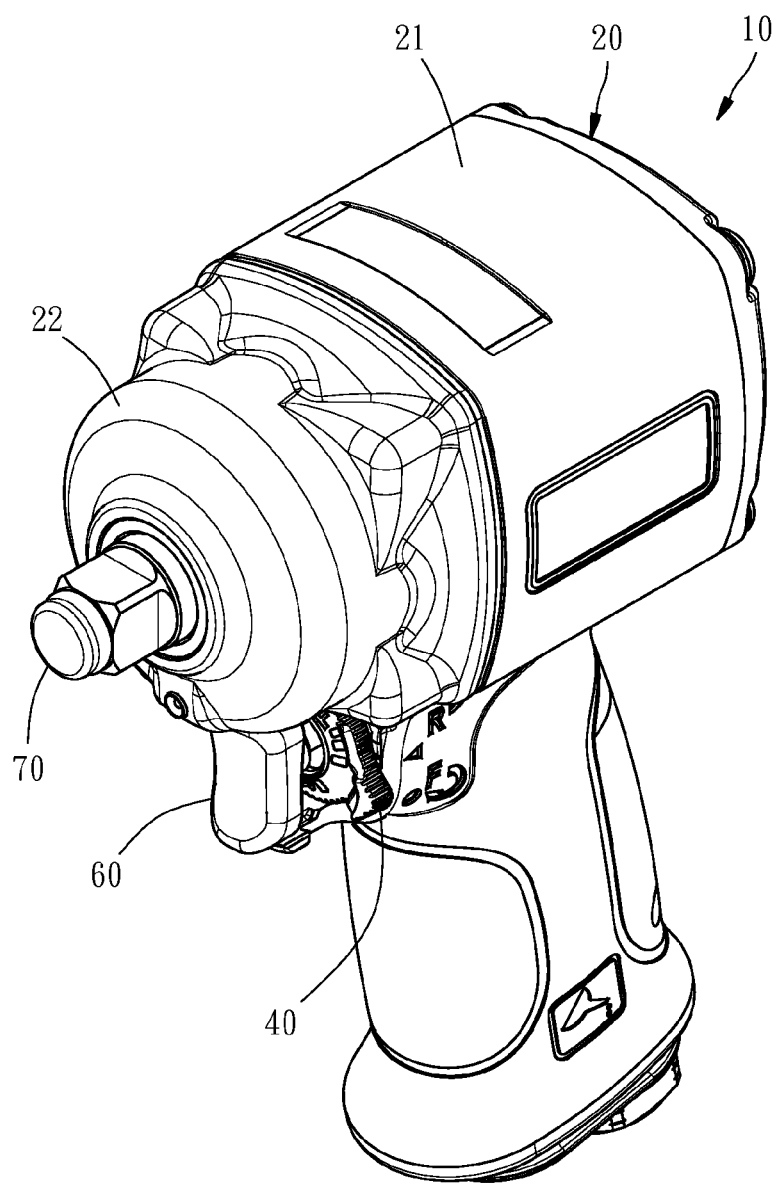
FIG. 1 is a perspective view of a pneumatic tool according to a preferred embodiment of the present invention.
Figure 2:
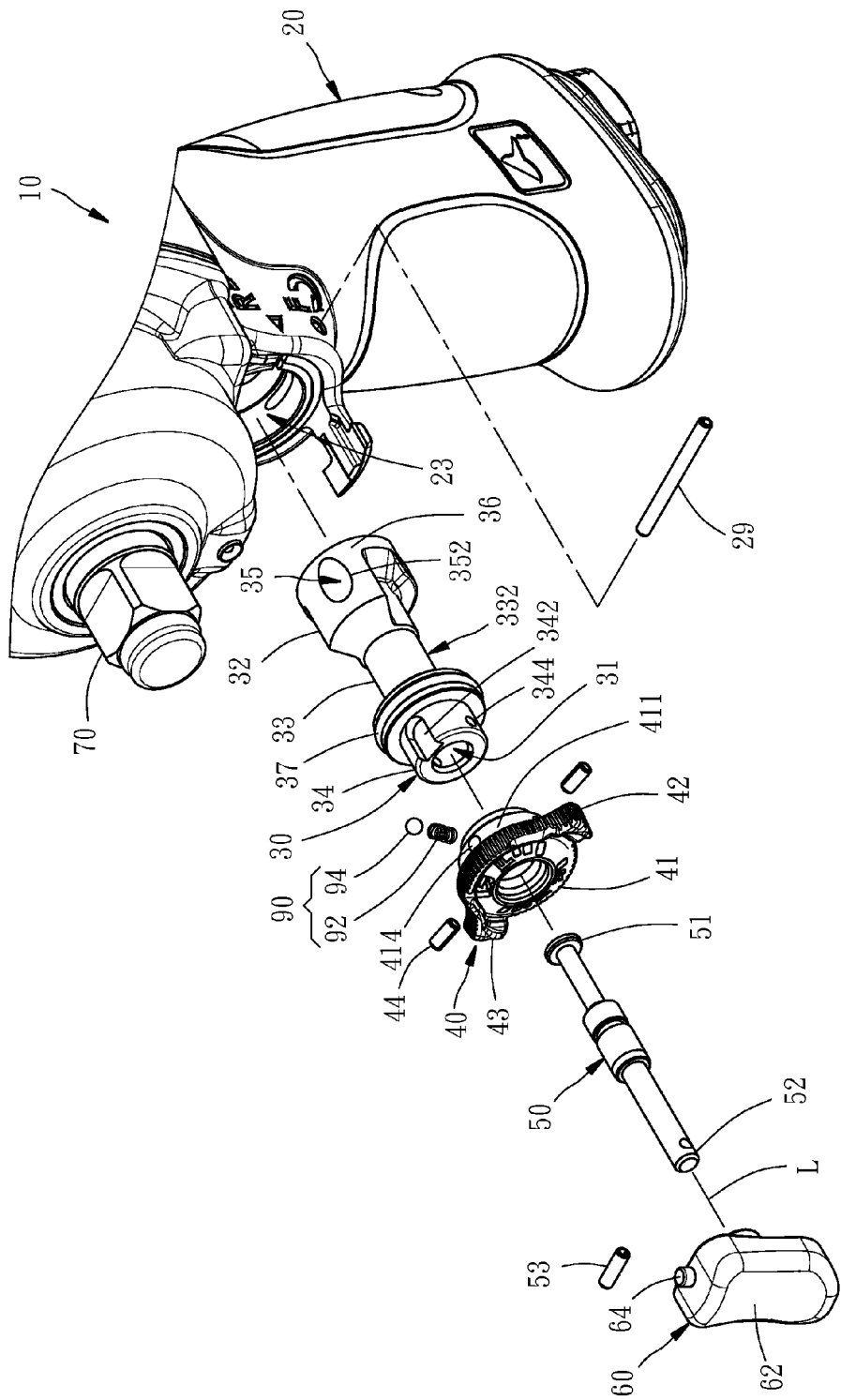
FIG. 2 is an exploded view of the pneumatic tool of FIG. 1.

Referring to FIG. 1 and FIG. 2, in a preferred embodiment of the present invention, a pneumatic tool 10 comprises a housing 20, a control valve 30, a controller 40, a pushing rod 50, and a trigger 60.

Figure 3:
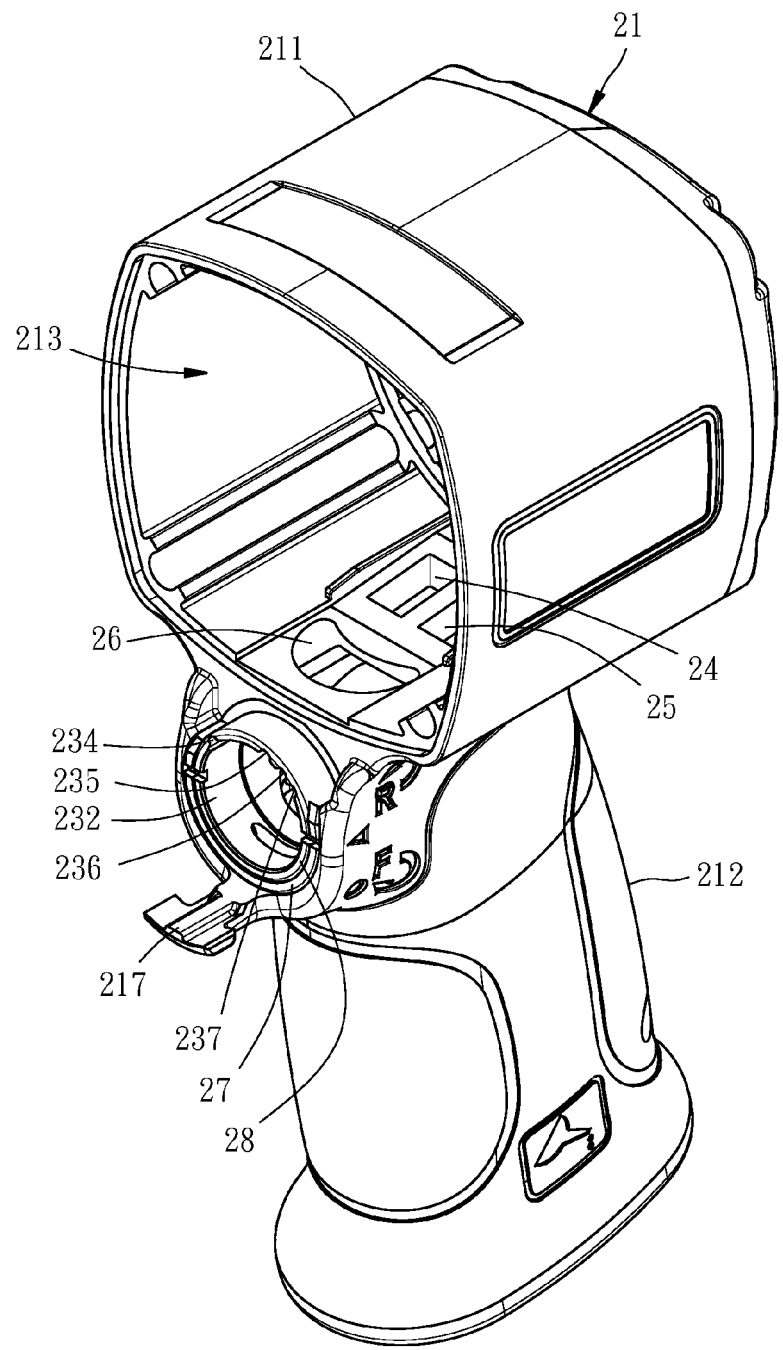
FIG. 3 is a perspective view of a housing of the pneumatic tool of FIG. 1.

The housing 20 includes a shell 21 and a cover 22. As shown in FIG. 3, the shell 21 has a head 211 for the cover 22 to connect, and a grip portion 212 for a user to hold. The head 211 defines therein an accommodating space 213 for receiving a motor (not shown). The motor has an output shaft 70 extending out the cover 22. The housing 20 has an installation tunnel 23 at the joint between the grip portion 212 and the head 211. The housing 20 also has a first air inlet 24, a second air inlet 25, and an air outlet 26 that communicate the installation tunnel 23 and the accommodating space 213.

Figure 4:
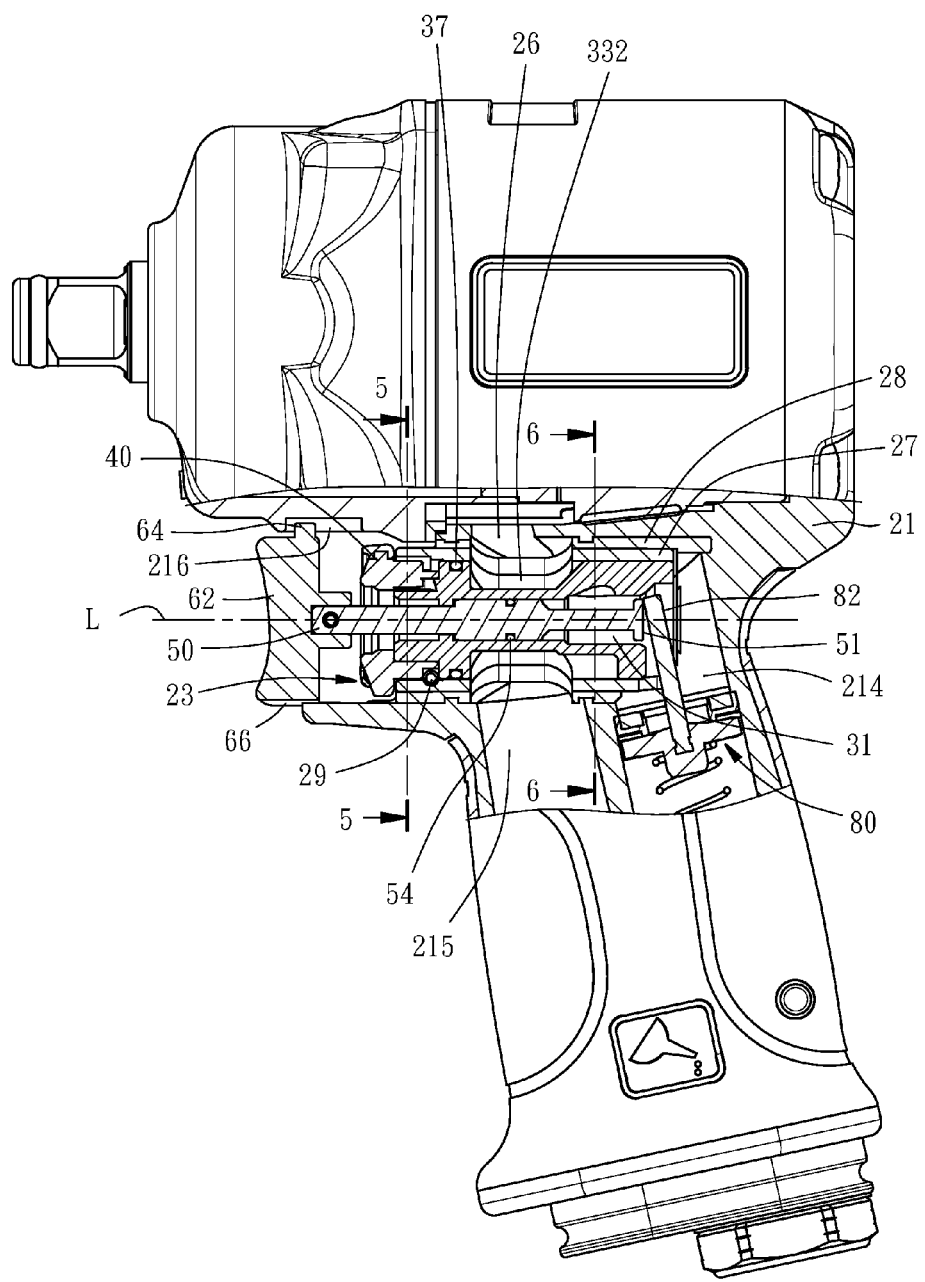
FIG. 4 is a cross-sectional view of the pneumatic tool of FIG. 1.
Figure 5:
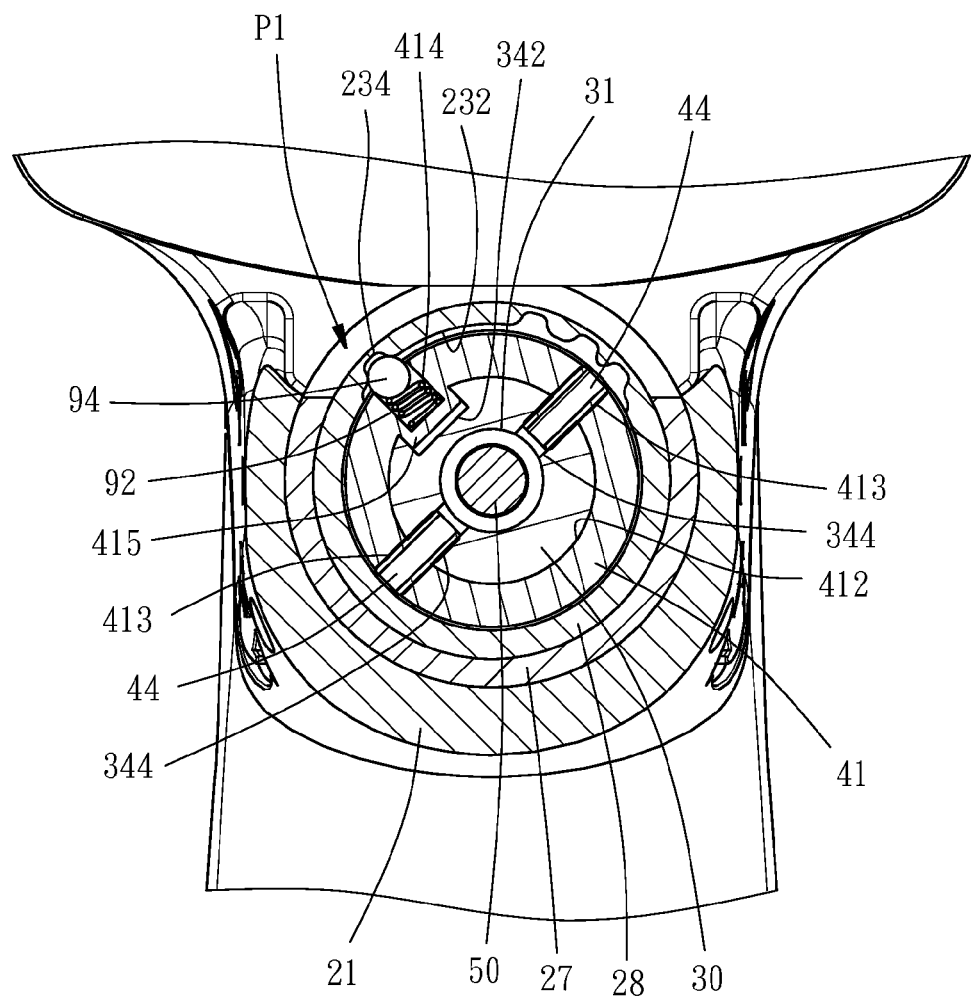
FIG. 5 and FIG. 6 are cross-sectional views of the pneumatic tool of FIG. 4 taken form Line 5-5 and Line 6-6, respectively, showing a control valve of the pneumatic tool being at a first position.
Figure 6:
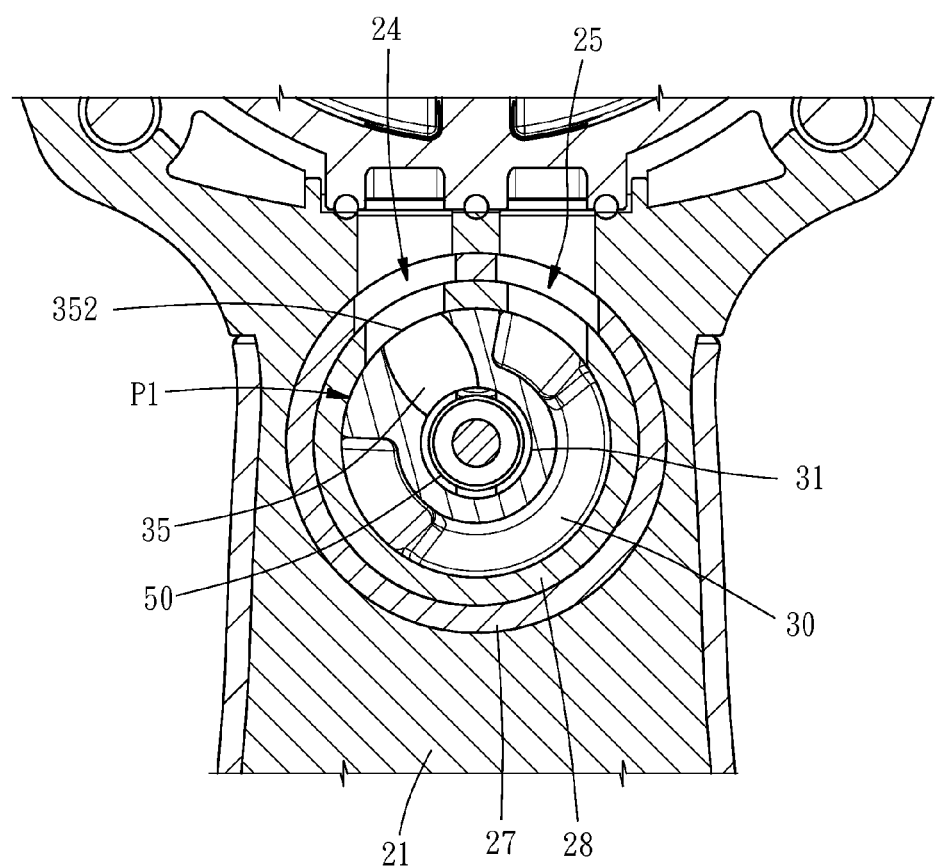

In the present embodiment, the housing 20 further comprises outer sleeve 27 and inner sleeve 28 received in the shell 21. The installation tunnel 23, the first and second air inlets 24, 25 and the air outlet 26 are defined jointly by the shell 21 and the inner and outer sleeves (as shown in FIG. 4 through FIG. 6). However, such a configuration is exemplificative but not limiting.

As shown in FIG. 4, the shell 21 further has an air supplying channel 214 and an exhausting channel 215 that are formed in the grip portion 212 and communicated with the installation tunnel 23. The air supplying channel 214 is equipped with an air inlet valve 80, which is known in the art and not described in detail herein.

As shown in FIG. 2, the control valve 30 is a column member containing therein an air incoming channel 31 passing through the control valve 30 along an imaginary axis L of the control valve 30. The control valve 30 can be divided, by profiles, into a rear section 32, a middle section 33, and a front section 34. The rear section 32 has an air supplying hole 35 communicated with the air incoming channel 31. The air supplying hole 35 has an opening 352 formed on an outer surface 36 of the control valve 30. The middle section 33 has a diameter-reduced segment, which forms an exhausting trough 332 that is depressed form the outer surface 36 and surrounds the diameter-reduced segment. The front section 34 has an engaging notch 342 at its outer periphery, and first and second through holes 344 formed opposite at its outer periphery.

The controller 40 has a ring-like main body 41, and two paddles 42, 43 extending outward form two opposite sides of the main body 41. The main body 41 has an outer periphery 411, an inner periphery 412 (as shown in FIG. 5), and first and second through holes 413 connecting the outer periphery 411 and the inner periphery 412. Two spring-loaded pins 44 pass through the first and second through holes 413, respectively, and pass through the first and second through holes 344, respectively, so that the main body 41 of the controller 40 is retained in the front section 34 of the control valve 30.

The pushing rod 50 such installed in the controller 40 and the control valve 30 that is can move along the imaginary axis L. The control valve 30, the controller 40, and the pushing rod 50, after assembled, are installed into the installation tunnel 23 of the housing 20. A spring-loaded pin 29 passes through the housing 20 and passes between the control valve 30 and the controller 40 (as shown in FIG. 4), so that the control valve 30 and the controller 40 are such retained in the installation tunnel 23 that they are allowed to rotate with respect to the housing 20. At this time, the air incoming channel 31 is communicated with the air supplying channel 214 of the housing 20. The opening 352 of the air supplying hole 35 faces the housing 20 and may be communicated with the first air inlet 24 or the second air inlet 25 (as detailed below). The exhausting trough 332 is communicated with the exhausting channel 215 and the air outlet 26. The pushing rod 50 has an inner end 51 and an outer end 52 that are opposite to each other. The inner end 51 is located in the air supplying channel 214 and abuts against a swinging stick 82 of the air inlet valve 80.

In the present embodiment, the control valve 30 and the controller 40 are positioned and held at specific angles by a positioning component 90 (including a spring member 92 and a ball 94), i.e. first through fourth positions P1-P4 as shown in FIG. 5 through FIG. 12. To this end, the main body 41 of the controller 40 further has a socket 414 depressed from the outer periphery 411 for the spring member 92 and the ball 94 to install therein in order. As shown in FIG. 5, the main body 41 of the controller 40 further has an engaging block 415 raised from the inner periphery 412. The socket 414 extends to the engaging block 415 and has a certain depth. In addition, the engaging block 415 is received by the engaging notch 342 at the front section 34 of the control valve 30. The control valve 30 and the controller 40 are assembled together before being fixed, so that the two spring-loaded pins 44 can be installed. The installation tunnel 23 of the housing 20 is formed with first through fourth positioning recesses 234-237 depressed from an inner wall 232 thereof, so that when the control valve 30 is at the first, second, third and fourth positions P1, P2, P3, P4, the ball 94 propped by the spring member 92 is located in the first, second, third and fourth positioning recesses 234, 235, 236, 237, respectively.

The trigger 60 is fixed to the outer end 52 of the pushing rod 50 by means of a spring-loaded pin 53. When a user operates the trigger 60, the pushing rod 50 is driven by the trigger 60 to push the swinging stick 82, so that the air inlet valve 80 is open. This is known in the art and not described in detail herein. At this time, air from outside reaching the air supplying channel 214 will enter the air incoming channel 31.

In the present embodiment, the head 211 of the housing 20 as a groove 216 formed at its bottom that is substantially parallel to the imaginary axis L (as shown in FIG. 4). The trigger 60 has a main body 62 for the user to press, and a bump 64 raised from a top of the main body 62. The bump 64 is slidably received in the groove 216, so that the trigger 60 and the pushing rod 50 are limited to move along the imaginary axis L and prevented form rotation. In addition, the housing 20 further has a guide 217 that is opposite to the groove 216 and is substantially parallel to the imaginary axis L (as shown in FIG. 3). The main body 62 of the trigger 60 has its bottom provided with a guiding groove 66 matching the guide 217 (as shown in FIG. 4), thereby achieving the foregoing effect as well.

Figure 7:
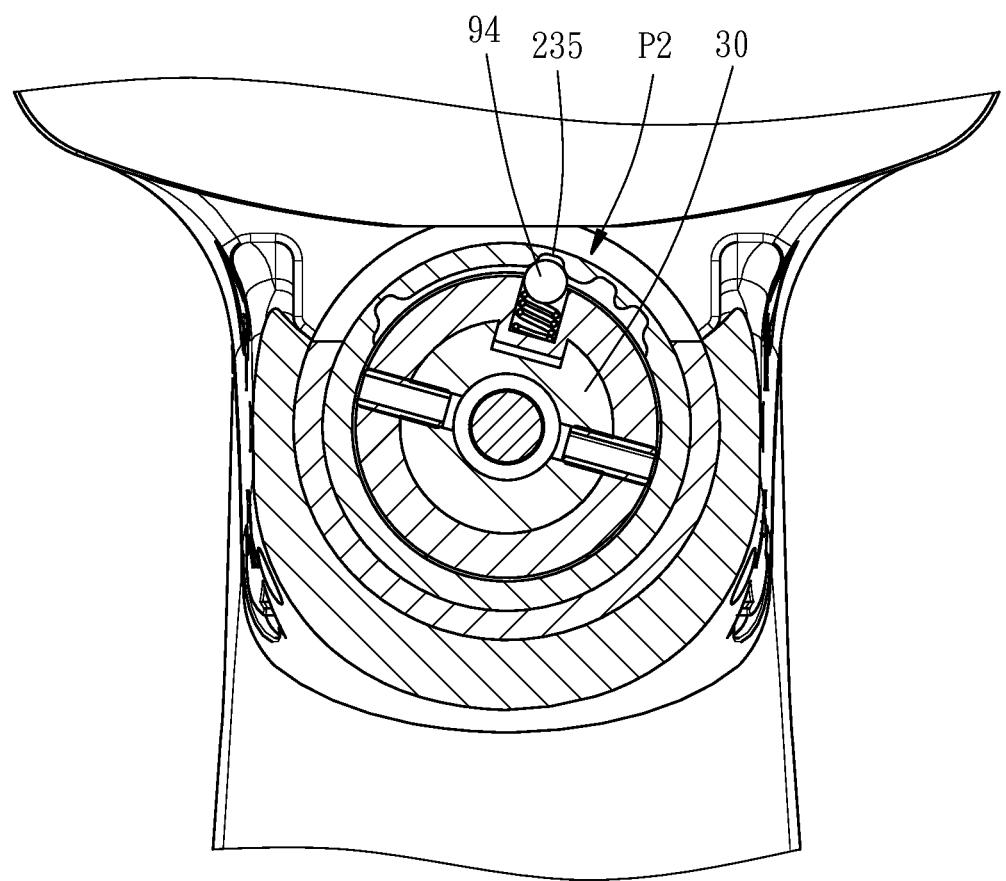
FIG. 7 and FIG. 8, similar to FIG. 5 and FIG. 6, show the control valve of the pneumatic tool being at a second position.
Figure 8:
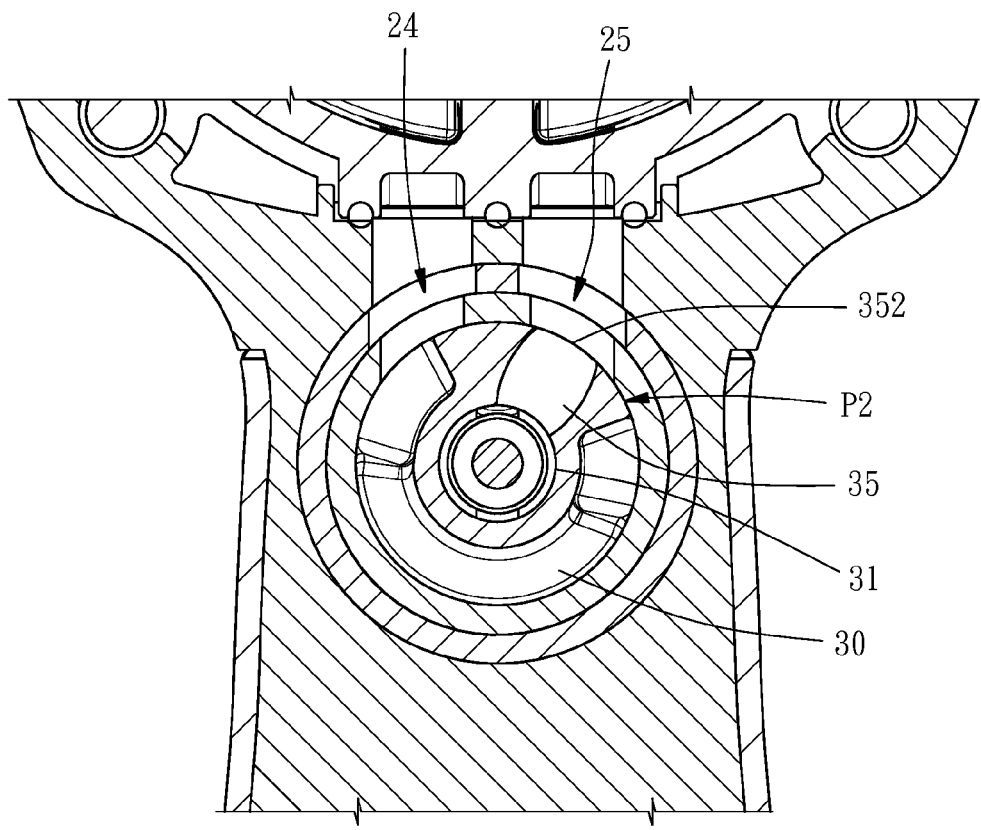
Figure 9:
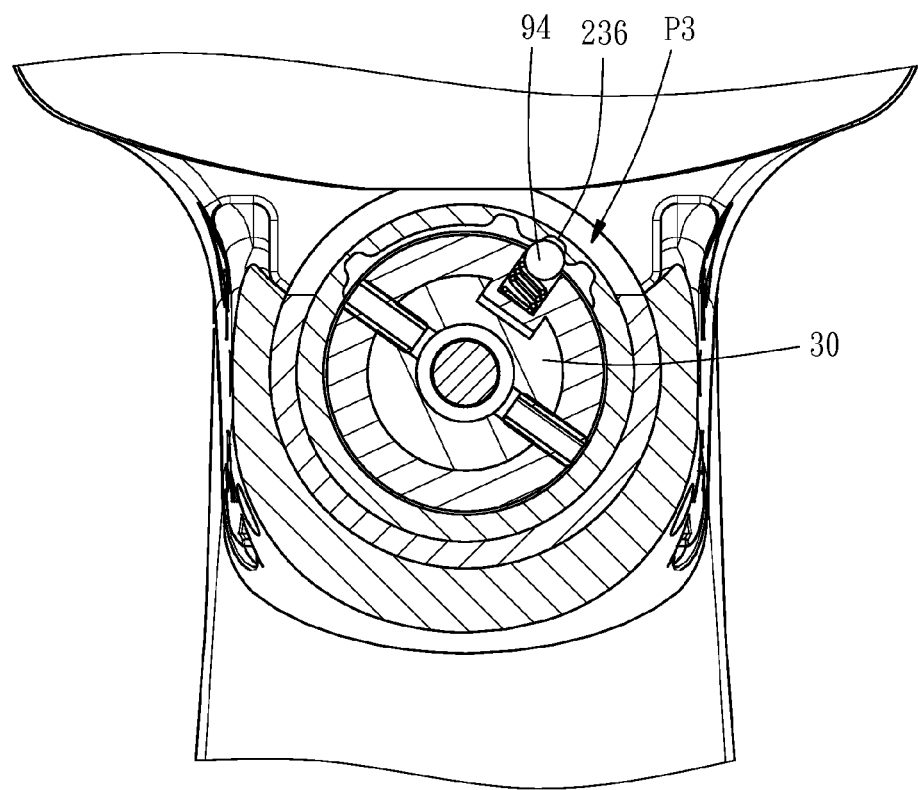
FIG. 9 and FIG. 10, similar to FIG. 5 and FIG. 6, show the control valve of the pneumatic tool being at a third position.
Figure 10:
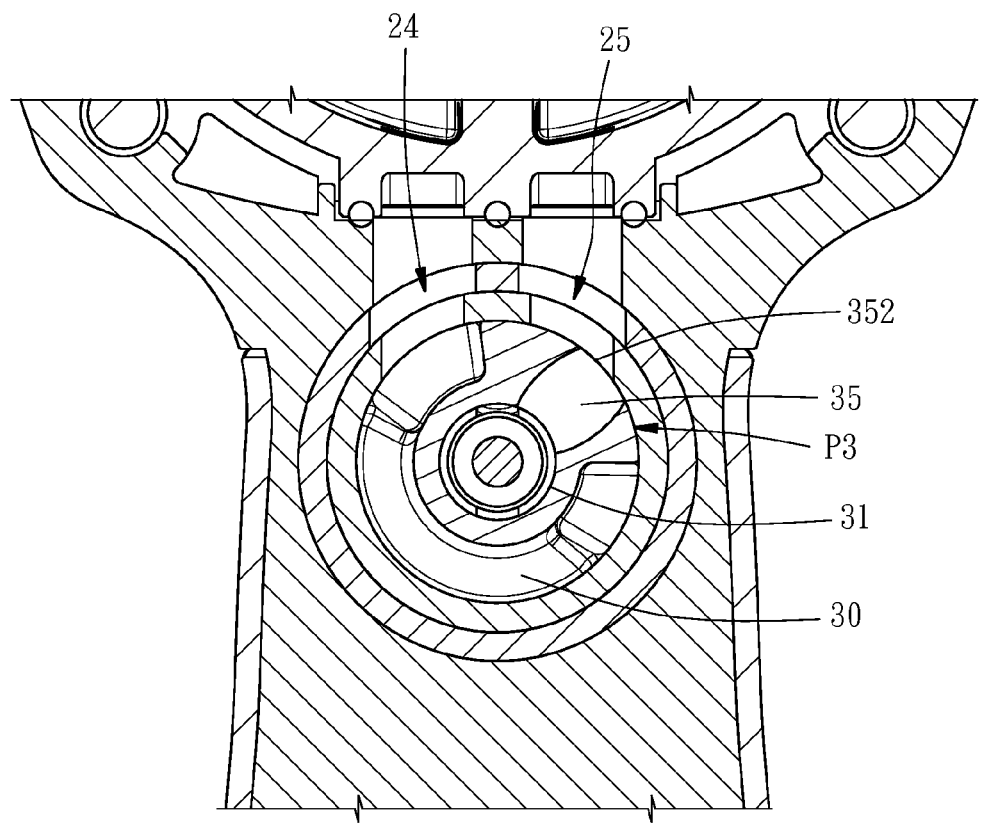
Figure 11:
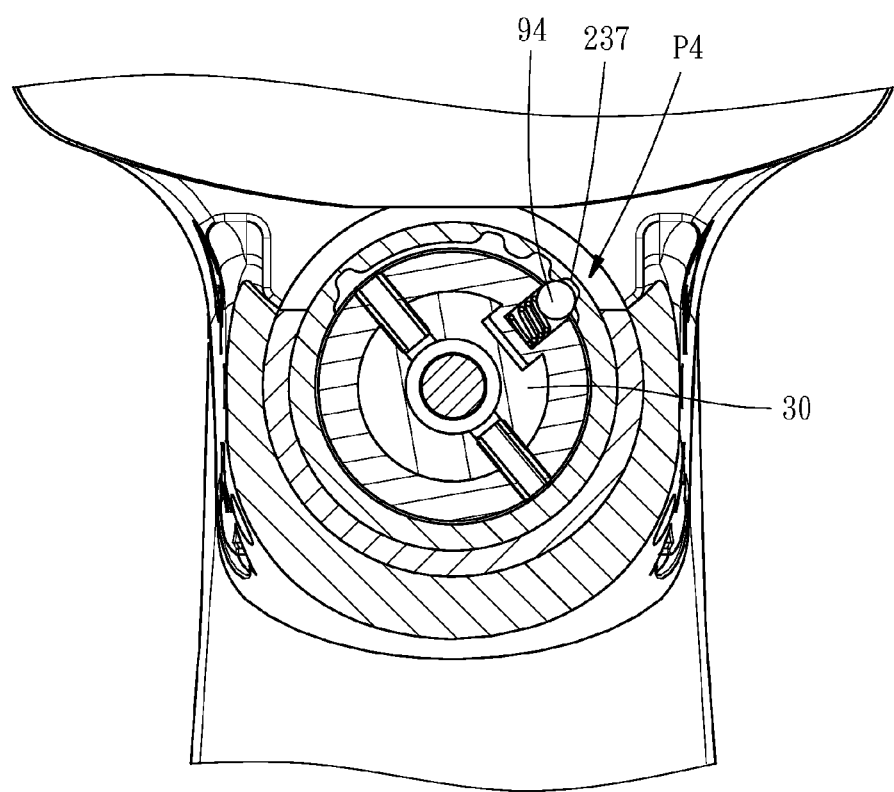
FIG. 11 and FIG. 12, similar to FIG. 5 and FIG. 6, show the control valve of the pneumatic tool being at a fourth position.
Figure 12:
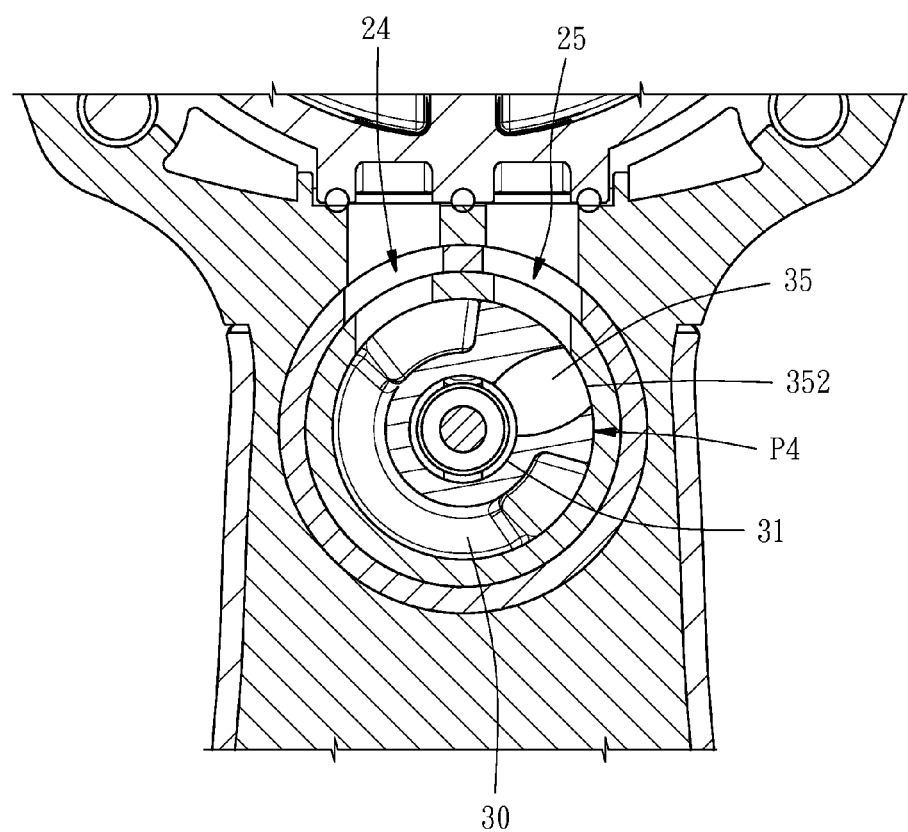

When operating the pneumatic tool 10, the user can press and release the trigger 60 to make the pneumatic tool 10 operate and stop, and he/she can also use the paddles 42, 43 outside the housing 20 to rotate the controller 40 and the control valve 30. When the control valve 30 is rotated to the first position P1, as shown in FIG. 5 and FIG. 6, the air supplying hole 35 is communicated with the first air inlet 24. At this time, gas in the air incoming channel 31 enters the accommodating space 213 through the air supplying hole 35 and the first air inlet 24, thereby driving the motor to make the output shaft 70 rotate reversely (namely anti-clockwise). When the control valve 30 is rotated to the second position P2 as shown in FIG. 7 and FIG. 8, the third position P3 as shown in FIG. 9 and FIG. 10, or the fourth position P4 as shown in FIG. 11 and FIG. 12, the air supplying hole 35 is communicated with the second air inlet 25. Gas in the air incoming channel 31 will enter the accommodating space 213 through the air supplying hole 35 and the second air inlet 25, thereby driving the motor to make the output shaft 70 rotate forward (i.e. clockwise).

When the control valve 30 is at the second position P2, the opening 352 of the air supplying hole 35 has its entire area corresponding to the second air inlet 25. At this time, the gas driving the motor is maximum and allows the output shaft 70 to reach its highest possible rotation rate. When the control valve 30 is at the third position P3, the opening 352 of the air supplying hole 35 has only its half area corresponding to the second air inlet 25. At this time, there is only half amount of gas available for driving the motor, so the rotation rate of the output shaft 70 is lowered accordingly. When the control valve 30 is at the fourth position P4, the opening 352 of the air supplying hole 35 merely has a small part thereof corresponding to the second air inlet 25, so the output shaft 70 rotates at a lowest rate.

As shown in FIG. 4, a seal ring 54 is mounted around the pushing rod 50 for abutting against the inner wall of the air incoming channel 31 of the control valve 30. In other words, the seal ring 54 is arranged between the pushing rod 50 and the control valve 30. In addition, the seal ring 54 is located in the middle section 33 of the control valve 30, so that the air supplying hole 35 is positioned between the seal ring 54 and the air supplying channel 214. Thereby, the seal ring 54 limits gas in the air incoming channel 31 to flow toward the first or second air inlet 24 or 25, meaning the gas is prevented from following to the controller 40.

Gas in the accommodating space 213 flows through the air outlet 26 and the exhausting trough 332 to the exhausting channel 215, and is then discharged out the housing 20. A seal ring 37 may be provided around the outer surface 36 of the control valve 30 so that it is located between the exhausting trough 332 and the controller 40. Thereby, the seal ring 37 limits gas in the exhausting trough 332 to flow to the exhausting channel 215, but not to the controller 40.

To sum up, in the present invention, when the control valve 30 is positioned differently, its air supplying hole 35 may correspond to the first air inlet 24 or the second air inlet 25, thereby realizing forward/reverse switching (namely changing the rotational direction of the output shaft 70). Besides, an area where the opening 352 of the air supplying hole 35 corresponds to the second air inlet 25 changes when the control valve 30 is at different positions, so that the rotation rate of the output shaft 70 can be adjusted. Thereby, a user can easily perform forward/reverse switching and speed adjustment using a single controller 40, so the use is convenient and the structure is relatively simple.

Additionally, when a user using his/her right hand to hold the grip portion 212, he/she can smoothly operate the paddle 42 with his/her right hand's thumb. when a user using his/her left hand to hold the grip portion 212, he/she can smoothly operate the paddle 43. Thereby, the controller 40 is well adaptive to both left-handed and right-handed users without using any converting means. This allows convenient use of the tool.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A pneumatic tool using a single controller for both forward/reverse switching and speed adjustment, the pneumatic tool comprising:

a housing, having an installation tunnel, an air supplying channel communicated with the installation tunnel, a first air inlet, and a second air inlet;

a control valve, being such installed in the installation tunnel that the control valve is allowed to shift among a first position, a second position and a third position, wherein the control valve has an air incoming channel communicated with the air supplying channel, and an air supplying hole communicated with the air incoming channel, and the air supplying hole has an opening facing the housing;

the controller, having a main body deposited in the control valve, and two paddles extending outward from two opposite sides of the main body, respectively, wherein the two paddles are exposed outside the housing for a user to operate one said paddle in order to rotate the controller and the control valve;

a pushing rod, such passing through the controller and the control valve that the pushing rod is allowed to move along an imaginary axis, wherein the pushing rod has an inner end located in the air supplying channel, and an outer end opposite to the inner end; and a trigger, being deposited at the outer end of the pushing rod, wherein, the air supplying hole is communicated with the first air inlet when the control valve is at the first position, and is communicated with the second air inlet when the control valve is at the second position and the third position, and corresponding areas between the opening of the air supplying hole and the second air inlet formed when the control valve is at the second position and at the third position are different; and wherein the control valve has a rear section, a middle section, and a front section, in which the air supplying hole is located in the rear section, and the controller is located in the front section, and the middle section has an exhausting trough, while the housing further comprises an exhausting channel and an air outlet that are communicated with the exhausting trough.

2. The pneumatic tool of claim 1, wherein the housing further comprises a groove that is parallel to the imaginary axis, and the trigger has a main body for the user to operate and a bump such raised from the main body that the bump is received in the grooved of the housing.

3. The pneumatic tool of claim 1, wherein the housing further comprises a guide that is parallel to the imaginary axis, and the trigger has a guiding groove that matches the guide.

4. The pneumatic tool of claim 1, wherein the installation tunnel of the housing has an inner wall and a first positioning recess, a second positioning recess and a third positioning recess that are depressed from the inner wall, and the controller has a socket that receives therein a spring member and a ball propping up by the spring member, in which the ball is retained by the first positioning recess, the second positioning recess, and the third positioning recess, respectively, when the control valve is at the first position, the second position, and the third position.

5. The pneumatic tool of claim 4, wherein the control valve has an engaging notch, and the controller has an outer periphery, an inner periphery, and an engaging block that is raised form the inner periphery and receiving in the engaging notch, in which the socket is depressed form the outer periphery and extends to the engaging block.

6. The pneumatic tool of claim 1, wherein the control valve has an outer surface on which the opening of the air supplying hole is located, and the exhausting trough of the middle section is depressed from the outer surface.

7. The pneumatic tool of claim 1, wherein a seal ring is provided between the pushing rod and the control valve, and the air supplying hole of the control valve is located between the seal ring and the air supplying channel.

8. The pneumatic tool of claim 1, wherein the housing further comprises an exhausting channel and an air outlet that are communicated with the installation tunnel, and the control valve has an outer surface and an exhausting trough that is depressed form the outer surface and is communicated with the exhausting channel and the air outlet, while the outer surface is further provide with a seal ring, so that the seal ring is located between the exhausting trough and the controller.

* * * * *